Patented Apr. 11, 1939

2,154,176

UNITED STATES PATENT OFFICE 2,154,176

CARBAZOLE DERIVATIVES

Walter Mieg, Opladen, and Willy Burneleit, Cologne-Deutz, Germany, assignors to General Aniline Works, Inc., New York, N. Y., a corporation of Delaware No Drawing. Application July 14, 1936, Serial No. 90,612. In Germany August 2, 1935

6 Claims. (Cl. 260—315)

The present invention relates to a new process of preparing carbazole derivates and to new carbazole derivatives which are obtainable thereby.

It is known that anthrimides, i. e. secondary amines wherein the two substituents are of the anthraquinone series can be converted into carbazoles by the action of aluminum halogenides. However, this method of working cannot be applied generally to the preparation of carbazoles from arylaminoanthraquinones. Carbazoles of the said type can be prepared by causing agents which are capable of splitting off hydrogen halide to react upon α-anilidoanthraquinones which, in either the aryl or anthraquinone-nucleus, contain a halogen atom in o-position to the imino group. A process of this kind is described in the co-pending application Serial No. 31,725 filed July 31st, 1935, by Walter Mieg. However, the said process is not capable of effecting carbazole-ring-closure of other arylaminoquinones f. i. of arylaminonaphthoquinones.

One object of our present invention is the development of a new process which can be applied generally to the preparation of carbazoles from secondary amines, wherein one substituent represents an aryl radical and the other represents a p-quinone of a ring-system having at least two condensed nuclei. Other objects of our invention will be apparent from the following description and claims.

We have found that carbazoles of the type specified in the preceding paragraph can be prepared by causing copper to react at an elevated temperature upon secondary amines of the character described wherein each of the said radicals contains a halogen atom in one o-position with respect to the imino group. The reaction is preferably performed in the presence of a high boiling solvent such as nitrobenzene, naphthalene, quinoline, diphenylether or benzophenone. The reaction temperature is preferably kept at about 200° C. to about 220°. We prefer to work in the presence of nitrobenzene as the boiling point thereof lies within the said range and serves to keep the reaction temperature within the optimal limits. Tertiary amines such as quinoline or pyridine may have an accelerating action on the reaction.

Suitable aryls are the phenyl-, naphthyl-, diphenylyl-, fluorenyl-, pyrene- or chrysene radicals. Residues of partially hydrogenated aryls such as of tetrahydronaphthalene or hexahydrodiphenyl are intended to fall within the term "aryl radicals". The term "p-quinone of a ring system having at least two condensed nuclei" includes in the first line naphthoquinones and anthraquinones though quinones of higher ring systems are not excluded from our invention. The starting materials may contain various substituents without departing from the scope of our invention. By way of example alkyl-, oxyalkyl-, amino- and nitro groups may be mentioned. The starting materials may even contain further halogen atoms as those contained in o-position to the imino group are more reactive than other halogen atoms.

Another object of our invention resides in the new compounds which are obtainable by our new process. As part of the carbazoles described herein have already been prepared according to other methods we confine ourselves to claim as a new product the compound of the following formula:

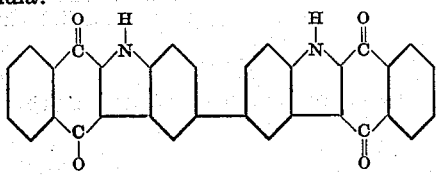

This product is a valuable vat dyestuff.

The following examples illustrate the invention without, however, restricting it thereto, the parts being by weight:

Example 1

3,2 parts of bromine are added at room-temperature drop by drop to a mixture of 6 parts of 2-p-toluido-3-chloro-α-naphthoquinone and 100 parts of glacial acetic acid, whereby an atom of bromine is caused to enter the toluidine residue in the ortho-position to the imino group. Stirring is continued for some time and then the precipitated product is filtered with suction. 6.9 parts of the brominated product thus obtained are heated to boiling for about 25 minutes while stirring with 4 parts of copper-powder and 18 parts of nitrobenzene. After cooling the precipitated product is filtered with suction and freed from copper by obvious methods analogous to the method disclosed in Berichte der Deutschen Chemischen Gesellschaft, vol. 49, 1916, page 741, lines 6 to 10. It recrystallizes from nitrobenzene in yellow needles and is free from halogen. It dyes wool from a gold-yellow vat strong yellow shades.

Example 2

A mixture of 8 parts of 2-(4-chloro-2-bromoanilino)-3-chloro-α-naphthoquinone, obtained by brominating 2-p-chloranilino-3-chloro-α-naphthoquinone, 8 parts of copper powder and 36 parts of nitrobenzene are heated to boiling while stirring for 25 minutes. The product is isolated as mentioned in Example 1. When recrystallized from nitrobenzene it represents yellow needles.

Example 3

10 parts of 2-(1-bromo-2-naphthylamino)-3-chloro-α-naphthoquinone obtained by brominating 2-β-naphthylamino-3-chloro-α-naphthoquinone are heated to boiling for 35 minutes with 10 parts of copper-powder and 48 parts of nitrobenzene. The product is isolated as set forth in Example 1. It is obtained by recrystallizing from pyridine in the form of red-brown needles. The animal fibre is dyed from the vat orange shades.

Example 4

18 parts of 2-(2-bromo-4-phenyl-anilino)-3-chloro-α-naphthoquinone, obtainable by brominating 2-p-phenylanilino-3-chloro-α-naphthoquinone, are heated to boiling for 35 minutes in admixture with 18 parts of copper and 84 parts of nitrobenzene while stirring. The product is isolated as described in Example 1. When recrystallized from nitrobenzene it represents yellow prisms. The dyestuff dyes the animal fibre from a yellow vat orange shades.

Example 5

10 parts of 2-(monobromo-2-fluorenonyl-amino)-3-chloro-α-naphthoquinone, obtained by brominating the condensation products of 1 mol of 2,3 dichloro-α-naphthoquinone and 1 mol of 2-amino-fluorenone are heated to boiling with 10 parts of quinoline and 10 parts of copper powder for 35 minutes while stirring. The product is isolated as set forth in Example 1. After extraction with pyridine the dyestuff forms light brown crystals.

Example 6

50 parts of the compound of the following constitution:

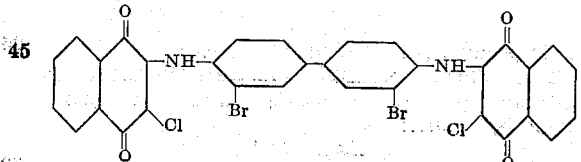

obtained by brominating the condensation product from 2 mols of 2,3-dichloro-α-naphthoquinone and 1 mol of benzidine are heated in admixture with 75 parts of copper-powder, 360 parts of nitrobenzene and 75 parts of quinoline to boiling while stirring for one hour. Then the mixture is cooled down to about 60° and treated with 300 parts of alcohol. The product is isolated as mentioned in Example 1. After extraction with pyridine the dyestuff represents brown crystals. The product dyes cotton clear brown shades. It corresponds to the following formula:

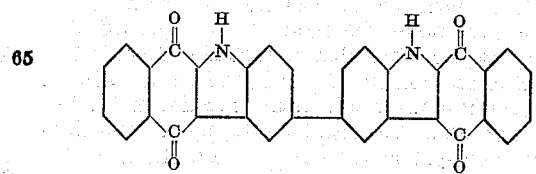

Example 7

A solution of 7.5 parts of bromine in 15 parts of nitrobenzene is slowly added at room temperature to a mixture of 16 parts of 1-toluido-2-bromanthraquinone and 90 parts of nitrobenzene, whereby one atom of bromine is caused to enter the toluidine residue in the ortho-position to the imino-group. Stirring is continued for some time and the red-brown precipitated crystals are sucked off.

10 parts of the 1-p-toluido-2,2'-dibromanthraquinones thus obtained are heated while stirring for nearly 30 minutes in a mixture of 70 parts of nitrobenzene and 20 parts of quinoline, with the addition of 5 parts of copper-powder. The mixture is refluxed until the originally red color of the solution has changed to brown-yellow. After cooling the precipitated orange-yellow crystals of the 6-methyl-1,2-phtaloyl-carbazole are filtered off and freed from copper as disclosed in Example 1.

Example 8

19.5 parts of 1-(1-bromo-2-naphthylamino)-2-bromo-anthraquinone, obtained by brominating 1-β-naphthylamino-2-bromo-anthraquinone are heated to boiling while stirring for one hour with 19 parts of copper-powder, 90 parts of nitrobenzene and 20 parts of pyridine. After cooling the resulting product is filtered with suction, freed from copper as disclosed in Example 1 and recrystallized from nitrobenzene. The dyestuff represents brown needles.

Example 9

19 parts of the condensation product from 1 mol of 2.3-dichloronaphthoquinone-1.4 and 1 mol of tetrahydro-beta-naphthylamine of the following formula:

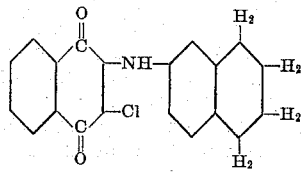

are dissolved in 100 parts of glacial acetic acid. Into this solution there are added drop by drop while stirring at room temperature 8.5 parts of bromine. The bromination product separates out in form of crystals. 18 parts of the brominated product thus obtained are heated to boiling for 30 minutes with 100 parts of nitrobenzene, 18 parts of quinoline and 15 parts of copper powder. After cooling the mixture is treated with 100 parts of methyl alcohol, filtered with suction and freed from copper as disclosed in Example 1. The product crystallizes from nitrobenzene in yellow needles. The dyestuff dyes cotton orange shades.

Example 10

8,5 parts of bromine are added drop by drop to 18 parts of the condensation product from 1 mol of 2.3-dichloronaphthoquinone-1.4 and 1 mol of hexahydroaminodiphenyl of the following formula:

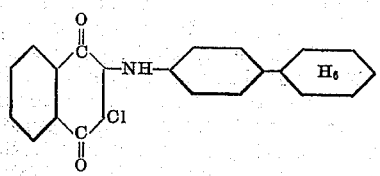

in 90 parts of glacial acetic acid at room temperature. Then stirring is continued at room temperature for one hour, whereby the product separates out in red needles.

18 grams of the brominated product thus obtained are heated with 80 parts of nitrobenzene, 18 parts of copper and 15 parts of quinoline for 30 minutes to the boiling point of the mixture. After cooling the mixture is filtered with suction and the product freed from copper as disclosed in Example 1. The dyestuff crystallizes from nitrobenzene in yellow needles and dyes from the vat animal fibers greenish yellow shades.

We claim:

1. The compound of the formula:

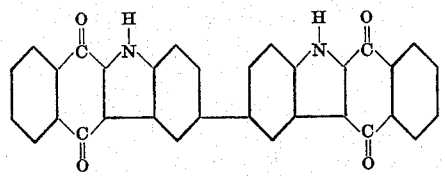

2. The process which comprises treating the compound of the following formula

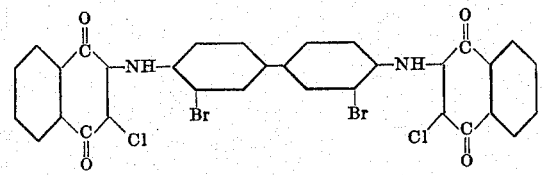

with copper powder in the presence of boiling nitrobenzene containing quinoline for about an hour, cooling the mixture, separating the precipitated product and freeing it from copper whereby the product of the following formula is obtained

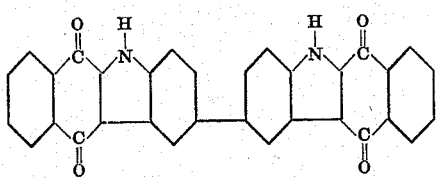

being brown crystals which dye cotton clear brown shades.

3. The process of preparing carbazoles which comprises reacting copper at an elevated temperature with a secondary amine wherein one of the substituents represents an aryl radical and the other represents a 1-4-naphthoquinone radical, the imino group being directly attached to a benzene ring of the aryl radical and to the para-quinone ring of the other radical and wherein each of the said radicals contains a halogen atom in one ortho-position to the imino group.

4. The process of preparing carbazoles which comprises reacting copper at an elevated temperature with a secondary amine wherein one of the substituents represents an aryl radical and the other represents a 1-4-naphthoquinone radical, the imino group being directly attached to a benzene ring of the aryl radical and to the para-quinone ring of the other radical and wherein each of the said radicals contains a halogen atom in one ortho-position with respect to the imino group, the reaction being performed in the presence of an indifferent high boiling solvent.

5. The process of preparing carbazoles which comprises reacting copper at an elevated temperature with a secondary amine wherein one of the substituents represents an aryl radical and the other represents a 1-4-naphthoquinone radical, the imino group being directly attached to a benzene ring of the aryl radical and to the para-quinone ring of the other radical and wherein each of the said radicals contains a halogen atom in one ortho-position with respect to the imino group, the reaction being performed in the presence of an indifferent high boiling solvent having dissolved therein a tertiary amine.

6. The process of preparing carbazoles which comprises reacting copper at a temperature between about 200° C. and about 220° C. with a secondary amine wherein one of the substituents represents an aryl radical and the other represents a 1-4-naphthoquinone radical, the imino group being directly attached to a benzene ring of the aryl radical and to the para-quinone ring of the other radical and wherein each of the said radicals contains a halogen atom in one ortho-position with respect to the imino group.

WALTER MIEG.
WILLY BURNELEIT.